US006519516B2

(12) United States Patent
Pfaeffle et al.

(10) Patent No.: US 6,519,516 B2
(45) Date of Patent: Feb. 11, 2003

(54) METHOD AND DEVICE FOR SAFEGUARDING AGAINST MANIPULATION OF AN ODOMETER OR A TRIP RECORDER

(75) Inventors: Andreas Pfaeffle, Wuestenrot (DE); Martin Grosser, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 09/751,066

(22) Filed: Dec. 28, 2000

(65) Prior Publication Data

US 2001/0021889 A1 Sep. 13, 2001

(30) Foreign Application Priority Data

Dec. 28, 1999 (JP) .......................................... 199 63 211

(51) Int. Cl.[7] ................................................ B60R 25/10
(52) U.S. Cl. .......................... 701/35; 340/426; 340/438
(58) Field of Search ........................... 701/35; 340/438, 340/426; 702/158, 165

(56) References Cited

U.S. PATENT DOCUMENTS 4,642,787 A * 2/1987 McCarthy et al. .......... 702/165
5,497,323 A 3/1996 Pastorek et al. .............. 701/35
5,541,858 A * 7/1996 Warner ....................... 702/165
6,232,874 B1 * 5/2001 Murphy ...................... 340/426

FOREIGN PATENT DOCUMENTS

| | | |
|---|---|---|
| DE | 29 11 160 | 10/1980 |
| DE | 39 20 385 | 1/1991 |
| GB | 2 336 911 | 11/1999 |

* cited by examiner

*Primary Examiner*—William A. Cuchlinski, Jr.
*Assistant Examiner*—Marthe Y. Marc-Coleman
(74) *Attorney, Agent, or Firm*—Kenyon & Kenyon

(57) ABSTRACT

A method of safeguarding against manipulation of an odometer or trip recorder in a motor vehicle, in which the instantaneous odometer reading is determined when the engine of the motor vehicle is stopped and that odometer reading is stored in an on-board control unit, in particular an engine control unit. Moreover, the instantaneous odometer reading of the odometer on restarting the engine is determined, and the odometer reading found on restarting the engine is compared with the stored odometer reading. Suitable measures are initiated for the case when the odometer reading found on restarting the engine and the stored odometer reading do not match.

8 Claims, 2 Drawing Sheets

METHOD AND DEVICE FOR SAFEGUARDING AGAINST MANIPULATION OF AN ODOMETER OR A TRIP RECORDER

FIELD OF THE INVENTION

The present invention relates to a method and a device for safeguarding against manipulation of an odometer or a vehicle recorder in a motor vehicle.

BACKGROUND INFORMATION

With the vehicle control concepts in use today, it is possible to establish a connection between a vehicle cockpit and an engine control unit over a CAN interface. It is known that the mileage of an odometer provided in an vehicle can be entered into the engine control unit in the event of a fault and stored there. A fault diagnosis may be facilitated with this measure.

Unexamined German Patent 29 11 160 describes a device for preventing unauthorized startup of a vehicle having an information carrier connected preferably to the key provided for the mechanical locks of the vehicle and having an analyzer circuit which triggers a signal when the correct information has been entered. That reference describes in particular how the reading on an odometer and/or an elapsed time meter can be transferred to the vehicle key and stored there. Then the vehicle can be started up again only when the start of the odometer or the elapsed time meter is transferred back from the key into an analyzer unit on the vehicle during the startup operation. That publication is concerned with safeguarding against theft of vehicles but not with the manipulation of odometer readings or trip recorders, which has been occurring more and more frequently in recent times.

SUMMARY OF THE INVENTION

An object of the present invention is a simple and inexpensive method of safeguarding against manipulation of odometers or trip recorders in motor vehicles.

The present invention makes available a method of safeguarding against manipulation of odometers or trip recorders in motor vehicles in a simple and inexpensive manner. To perform such a manipulation effectively, changes in the instantaneous or stored mileage readings would have to be made both in the cockpit (i.e., the trip recorder) and in the control unit, and this is a much more complex and technically difficult job in comparison with traditional methods of manipulation.

According to a preferred embodiment of the method according to the present invention, an engine function of the motor vehicle is suppressed if the respective instantaneous and stored odometer readings do not match. As an additional effect, this measure makes available an effective deterrence or safeguard against theft of the vehicle.

If the respective odometer readings do not match, an alarm signal is advantageably triggered. Such an alarm signal may be either acoustic or optical or it may be relayed to a central security office by way of appropriate wireless connections. In conjunction with known positioning devices, a motor vehicle on which the odometer has been manipulated in this way can be located easily.

In a preferred embodiment of the device according to the present invention, when restarting the engine, the arrangement for determining the instantaneous odometer reading and/or comparing the odometer reading with a stored odometer reading is implemented in the form of a combination instrument, and the arrangement for prompting suitable measures for the case when the odometer reading found on restarting the engine and the stored odometer reading do not match is implemented in the form of a transmission control unit or an engine control unit. Such devices which are traditionally provided with motor vehicles can be modified in the sense of the function described here with little or no effort.

DETAILED DESCRIPTION

Figure 1:
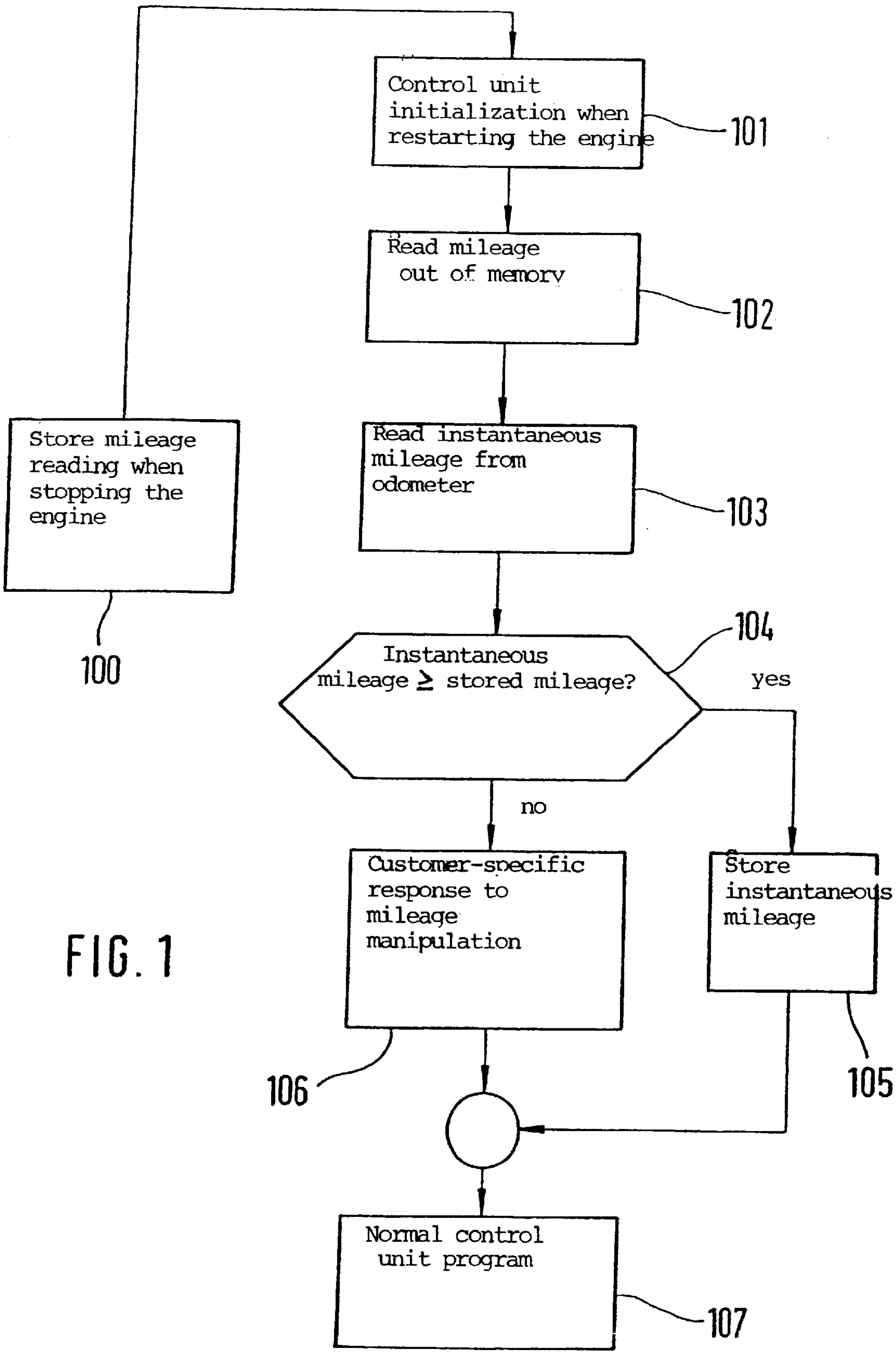
FIG. 1 shows a flow chart to illustrate a preferred embodiment of the method according to the present invention.

When the engine of the vehicle is stopped, the odometer reading or mileage on the odometer is stored in step 100. The odometer reading is stored in a memory in the on-board control unit which has an influence on the movement of the vehicle. A known engine control unit in particular can be mentioned here as an example.

In the case of restarting an engine, a control unit is first initialized (step 101) in a known manner. In a subsequent step 102, the mileage reading stored in the memory of the control unit is read out. In the next step 103, the instantaneous mileage reading on the odometer is read out. The mileage reading read out of the memory of the control unit is compared in step 104 with the instantaneous mileage reading of the odometer. The comparison can be performed, for example, by the control unit in which the mileage reading is stored or by any other control unit. If it is found in step 104 that the instantaneous mileage reading corresponds to the stored mileage reading, and in particular the instantaneous mileage reading is greater than or equal to the stored mileage reading, then it can be assumed that there has not been any manipulation of the odometer because such a manipulation is typically used to simulate a lower mileage. In this case, the instantaneous mileage reading is stored in step 105. Then the process branches off from step 105 to a step 107 where the normal control unit program can be carried out.

It should be pointed out here that step 105, i.e., storage of the instantaneous mileage reading when starting the engine again, can be omitted and the corresponding mileage reading may be stored only when the motor is stopped again, as already explained above with reference to step 100.

However, if it is found in step 104 that the instantaneous mileage reading does not match the stored mileage reading and in particular is smaller than the stored mileage reading, then in step 106 a customer-specific response to manipulation of the odometer which is assumed in this case is made possible. In other words, since it is assumed in this case that the odometer has been manipulated, various suitable measures can be initiated, such as suppression of engine function of the motor vehicle or triggering an alarm signal. After such measures have been carried out, it is also possible here to branch off to step 107, which makes it possible to carry out a normal control unit program.

It should be pointed out here that in the case when a cockpit or an odometer or a control unit is to be replaced (legally and on request by the owner of the vehicle), appropriate workshop tools are provided to permit appropriate handling or influencing of the method according to the present invention.

The method according to the present invention is a simple way of safeguarding against manipulation of an odometer which can be made available without any increased cost. To effectively perform a manipulation, changes would have to be made in the cockpit and the odometer and in the control unit at the same time; this represents a much greater complexity and technical difficulty in comparison with traditional options, and it can be carried out effectively only by an authorized workshop which is equipped with appropriate tools.

Figure 2:
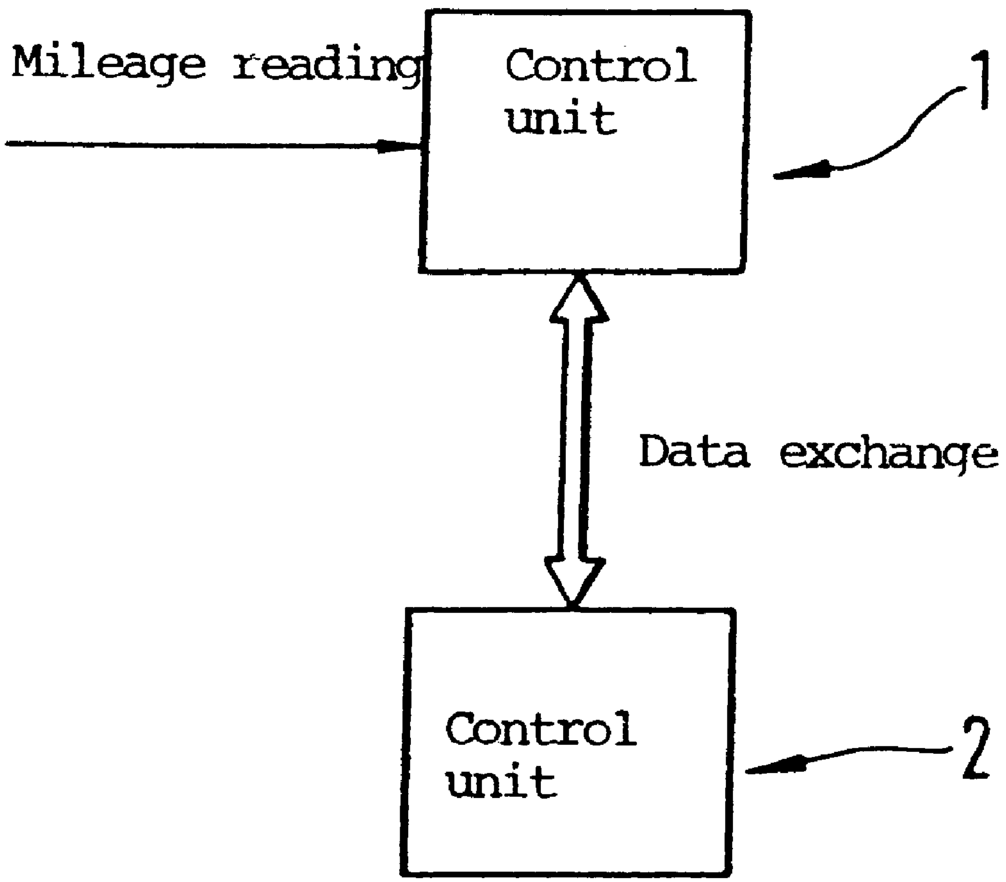
FIG. 2 shows a schematic diagram of a preferred embodiment of the device according to the present invention.

A preferred embodiment of the device according to the present invention is diagramed schematically in FIG. 2, which shows a first control unit 1 and a second control unit 2. Control units 1 and 2 are connected over a data exchange line, e.g., a bus line. At least one of control units 1, 2 is capable of entering an instantaneous mileage reading and comparing it with a stored mileage reading. Furthermore, at least one of control units 1, 2 is capable of initiating the desired response, e.g., suppressing engine function of the motor vehicle or triggering an alarm or positioning signal.

In one practical example, it would be possible to implement control unit 1 in the form of a combination instrument, for example, and control unit 2 in the form of a transmission control unit or an engine control unit. Then combination instrument 1 would send data to transmission or engine control unit 2, which would compare the data and initiate an appropriate response.

Finally, it should be pointed out that the device according to the present invention can also be implemented simply in the form of one control unit or also in the form of more than two control units.

What is claimed is:

1. A method for safeguarding against a manipulation of one of an odometer and a trip recorder in a motor vehicle, comprising the steps of:

determining an instantaneous odometer reading when an engine of the motor vehicle is stopped;

storing the instantaneous odometer reading in an on-board control unit;

determining the instantaneous odometer reading of the odometer on restarting the engine;

comparing the instantaneous odometer reading ascertained on restarting the engine with the stored instantaneous odometer reading; and initiating a measure when the instantaneous odometer reading ascertained on restarting the engine and the stored instantaneous odometer reading do not match.

2. The method according to claim 1, wherein:

the on-board control unit includes an engine control unit.

3. The method according to claim 1, further comprising the step of:

suppressing an engine function of the motor vehicle when the instantaneous odometer reading ascertained on restarting the engine and the stored instantaneous odometer reading do not match.

4. The method according to claim 1, further comprising the step of:

triggering an alarm signal when the instantaneous odometer reading ascertained on restarting the engine and the stored instantaneous odometer reading do not match.

5. A device for safeguarding against a manipulation of one of an odometer and a trip recorder in a motor vehicle, comprising:

an arrangement for determining an instantaneous odometer reading when an engine of the motor vehicle is stopped;

an arrangement for storing the instantaneous odometer reading in an on-board control unit;

an arrangement for determining the instantaneous odometer reading of the odometer on restarting the engine;

an arrangement for comparing the instantaneous odometer reading ascertained on restarting the engine with the stored instantaneous odometer reading; and an arrangement for instituting a measure when the instantaneous odometer reading ascertained on restarting the engine and the stored instantaneous odometer reading do not match.

6. The device according to claim 5, wherein:

at least one of the arrangement for determining the instantaneous odometer reading and the arrangement for comparing the stored instantaneous odometer reading with the odometer reading when restarting up the engine are implemented as a combination instrument.

7. The device according to claim 5, wherein:

the arrangement for instituting the measure is implemented as one of a transmission control unit and an engine control unit.

8. The device according to claim 5, wherein:

at least one of the arrangement for determining the instantaneous odometer reading and the arrangement for comparing the stored instantaneous odometer reading with the odometer reading when restarting up the engine are implemented as a combination instrument, and the arrangement for instituting the measure is implemented as one of a transmission control unit and an engine control unit.

* * * * *